(12) United States Patent
Faulkner

(10) Patent No.: US 12,320,710 B2
(45) Date of Patent: Jun. 3, 2025

(54) VACUUM APPARATUS TEMPERATURE SENSOR ASSEMBLY

(71) Applicant: Edwards Vacuum LLC, Sanborn, NY (US)

(72) Inventor: Budd Edward Faulkner, Hillsboro, OR (US)

(73) Assignee: Edwards Vacuum LLC, Sanborn, NY (US)

( * ) Notice: Subject to any disclaimer, the term of this patent is extended or adjusted under 35 U.S.C. 154(b) by 404 days.

(21) Appl. No.: 17/999,632

(22) PCT Filed: May 26, 2021

(86) PCT No.: PCT/IB2021/054562
§ 371 (c)(1),
(2) Date: Nov. 22, 2022

(87) PCT Pub. No.: WO2021/240378
PCT Pub. Date: Dec. 2, 2021

(65) Prior Publication Data
US 2023/0236070 A1    Jul. 27, 2023

(30) Foreign Application Priority Data
May 26, 2020 (GB) .................................... 2007793

(51) Int. Cl.
*G01K 1/16* (2006.01)
*G01K 1/143* (2021.01)

(52) U.S. Cl.
CPC ............... *G01K 1/16* (2013.01); *G01K 1/143* (2013.01)

(58) Field of Classification Search
CPC ................................. G01K 1/16; G01K 1/143
See application file for complete search history.

(56) References Cited

U.S. PATENT DOCUMENTS 3,336,804 A * 8/1967 Poppendiek ........... A61B 5/028
                                            374/E1.018
9,316,546 B2    4/2016 Tsubaki et al.
(Continued)

FOREIGN PATENT DOCUMENTS

CN    208253031 U    12/2018
CN    111102735 A    5/2020
(Continued)

OTHER PUBLICATIONS

Taiwanese Office Action and Search Report dated Nov. 27, 2024 for corresponding Taiwanese application Serial No. 110119056, 11 pages.
(Continued)

*Primary Examiner* — Mirellys Jagan
(74) *Attorney, Agent, or Firm* — Theodore M. Magee; Westman, Champlin & Koehler, P.A.

(57) ABSTRACT

A vacuum apparatus temperature sensor assembly for measuring the temperature of a vacuum apparatus and a method are disclosed. The vacuum apparatus temperature sensor assembly comprises: a sheet substrate configured to conform to a shape of an item, equipment or apparatus whose temperature is to be determined; and a temperature sensor thermally coupled with the sheet substrate, wherein the sheet substrate is configured to provide a thermal path from the apparatus to the temperature sensor. In this way, the substrate provides a larger area than that of the temperature sensor to couple with the apparatus which enables the average temperature of the apparatus to be more reliably and accurately conveyed to the temperature sensor and make the temperature measurements less reliant on the exact placing of the temperature sensor with respect to the apparatus.

7 Claims, 1 Drawing Sheet

(56) References Cited

U.S. PATENT DOCUMENTS

| | | |
|---|---|---|
| 2015/0312963 A1 | 10/2015 | Kiernan et al. |
| 2016/0193772 A1 | 7/2016 | Pendergraft et al. |
| 2017/0030503 A1 | 2/2017 | Faulkner et al. |
| 2017/0034873 A1 | 2/2017 | Faulkner et al. |
| 2019/0343397 A1 | 11/2019 | Meisal |

FOREIGN PATENT DOCUMENTS

| | | | |
|---|---|---|---|
| DE | 3126931 A1 | 2/1983 | |
| DE | 202013005207 U1 * | 10/2014 | ............ G01K 1/143 |
| EP | 3060364 B1 | 3/2018 | |
| EP | 3605027 A1 | 2/2020 | |
| EP | 3653885 A1 | 5/2020 | |
| FR | 2561382 A1 | 9/1985 | |
| GB | 410572 | 5/1934 | |
| KR | 20130053760 A | 5/2013 | |
| WO | WO-2022263022 A1 * | 12/2022 | .......... F16L 55/1683 |

OTHER PUBLICATIONS

PCT Notification of Transmittal of the International Search Report and the Written Opinion of the International Searching Authority, or the Declaration and PCT International Search Report dated Aug. 24, 21 for corresponding PCT application Serial No. PCT/IB2021/054562, 6 pages.

PCT Written Opinion dated Aug. 24, 2021 for corresponding PCT application Serial No. PCT/IB2021/053612, 7 pages.

British Examination Report dated Oct. 27, 20 and Search Report dated Oct. 26, 20 for corresponding British application Serial No. GB2007793.9, 8 pages.

PCT International Preliminary Report on Patentability dated Nov. 1, 2022 for corresponding PCT application Serial No. PCT/IB2021/054562, 6 pages.

Response to Written Opinion dated Mar. 9, 2022 for corresponding PCT application Serial No. PCT/IB2021/054562, 4 pages.

Taiwanese Search Report dated Mar. 31, 2025 and Office Action dated Apr. 1, 2025 for corresponding Taiwanese application Serial No. 110119056, 7 pages.

* cited by examiner

VACUUM APPARATUS TEMPERATURE SENSOR ASSEMBLY

CROSS-REFERENCE TO RELATED APPLICATION

This application is a Section 371 National Stage Application of International Application No. PCT/IB2021/054562 filed May 26, 2021, and published as WO 2021/240378 A1 on Dec. 2, 2021, the content of which is hereby incorporated by reference in its entirety and which claims priority of British Application No. 2007793.9, filed May 26, 2020.

FIELD

The field of the invention relates to a vacuum apparatus temperature sensor assembly for measuring the temperature of a vacuum apparatus and a method.

BACKGROUND

Temperature sensors assemblies are known. The temperature sensors can be used to measure the temperature of a variety of different items, equipment or apparatus.

Although such temperature sensors exist, their use can have unexpected consequences, particularly where the temperature of the items, equipment or apparatus is important to be measured accurately to provide for accurate and reliable temperature control.

Accordingly, it is desired to provide an improved temperature sensor assembly.

The discussion above is merely provided for general background information and is not intended to be used as an aid in determining the scope of the claimed subject matter. The claimed subject matter is not limited to implementations that solve any or all disadvantages noted in the background.

SUMMARY

According to a first aspect, there is provided a vacuum apparatus temperature sensor assembly, comprising: a sheet substrate configured to conform to a shape of an item, equipment or apparatus whose temperature is to be determined; and a temperature sensor thermally coupled with the sheet substrate, wherein the sheet substrate is configured to provide a thermal path from the vacuum apparatus to the temperature sensor.

The first aspect recognizes that a problem with existing temperature sensor arrangements is that the temperature reported by those arrangements can be unreliable since the temperature measured by the temperature sensor can be highly dependent on its positioning. Accordingly, a temperature sensor assembly is provided. The assembly may comprise a substrate. The substrate may be a sheet substrate. The substrate may be configured, arranged or adapted to shape, conform or comply with the shape of an apparatus having a temperature to be determined. The apparatus may be a vacuum apparatus. The assembly may comprise a temperature sensor. The sensor may be thermally coupled with or attached to the substrate. The substrate may provide a thermal path from the apparatus to the sensor. In this way, the substrate provides a larger area than that of the temperature sensor to couple with the apparatus which enables the average temperature of the apparatus to be more reliably and accurately conveyed to the temperature sensor and make the temperature measurements less reliant on the exact placing of the temperature sensor with respect to the apparatus.

The sheet substrate may be configured to conform with an external surface of the vacuum apparatus. In other words, the sheet substrate may wrap around the outside of the apparatus to provide thermal path across the sheet substrate and the vacuum apparatus.

The sheet substrate may be pliable to conform with the external surface of the vacuum apparatus. This helps to not only provide close contact between the sheet substrate and the vacuum apparatus to facilitate heat transfer, but also helps to hold the seat sheet substrate in place.

The sheet substrate may be a planar sheet.

The sheet substrate may have a length which is longer than its width.

The sheet substrate may have a width which is greater than a distance between heater elements of the vacuum apparatus. By making the width greater than this distance, it can be ensured that the sheet substrate will always overlie a heater element.

The sheet substrate may have a length which is greater than a length of the external surface of the vacuum apparatus.

The sheet substrate may have a length which provides for a plurality of turns around the vacuum apparatus. This again helps to improve the retention of the sheet substrate on the vacuum apparatus.

The sheet substrate may be configured to provide a greater thermal conductivity across the surface than between the plurality of turns. Hence, the main transmission path for heat is over the surface of the substrate rather than between the layers of the turns.

The sheet substrate may have a thermal conductivity which reduces a temperature variation across a surface of the sheet surface compared to a temperature variation across a surface of the vacuum apparatus. Accordingly, the sheet substrate may help to average the temperature differences across different parts of the vacuum apparatus to provide a more reliable temperature reading.

The sheet substrate may have a thermal mass which is lower than a thermal mass of the vacuum apparatus. This enables the sheet substrate to heat or cool more quickly than the vacuum apparatus and so respond to changes in temperature at least as quickly as the vacuum apparatus.

The sheet substrate may be interposed between the temperature sensor and the vacuum apparatus.

The temperature sensor may overlie the sheet substrate.

The sheet substrate may have a thermal conductivity which is greater than a thermal conductivity of the vacuum apparatus. This enables the sheet substrate to heat or cool more quickly than the vacuum apparatus and so respond to changes in temperature at least as quickly as the vacuum apparatus.

The sheet substrate may have a thermal conductivity which is greater than 8 W·m-1·K-1.

The sheet substrate may be metallic and/or carbon and/or graphene.

The sheet substrate may comprise an insulating layer. Providing an insulating layer helps to reduce the effects of external temperature variations on the temperature experienced by the temperature sensor.

The sheet insulating layer may be disposed on the sheet substrate. Accordingly, the sheet insulating layer may be formed as part of one layer of the sheet substrate.

The assembly may comprise an outer insulating layer overlying the sheet substrate and the temperature sensor.

According to a second aspect, there is provided a method, comprising: conforming a sheet substrate to a shape of a vacuum apparatus whose temperature is to be determined;

and thermally coupling a temperature sensor with the sheet substrate to provide a thermal path from the vacuum apparatus to the temperature sensor.

The method may comprise conforming the sheet substrate to an external surface of the vacuum apparatus.

The method may comprise configuring the sheet substrate to be pliable to conform to an external surface of the vacuum apparatus The method may comprise configuring the sheet substrate as a planar sheet.

The method may comprise configuring the sheet substrate to have a length which is longer than its width.

The method may comprise configuring the sheet substrate to have a width which is greater than a distance between heater elements of the vacuum apparatus.

The method may comprise configuring the sheet substrate to have a length which is greater than a length of the external surface of the vacuum apparatus.

The method may comprise configuring the sheet substrate to have a length which provides for a plurality of turns around the vacuum apparatus.

The method may comprise configuring the sheet substrate to provide a greater thermal conductivity across its surface than between the plurality of turns.

The method may comprise configuring the sheet substrate to have a thermal conductivity which reduces a temperature variation across a surface of the sheet surface compared to a temperature variation across a surface of the vacuum apparatus.

The method may comprise configuring the sheet substrate to have a thermal mass which is lower than a thermal mass of the vacuum apparatus.

The method may comprise interposing the sheet substrate between the temperature sensor and the vacuum apparatus.

The method may comprise overlying the temperature sensor over the sheet substrate.

The method may comprise configuring the sheet substrate to have a thermal conductivity which is greater than a thermal conductivity of the vacuum apparatus.

The method may comprise configuring the sheet substrate to have a thermal conductivity which is greater than 8 W·m-1·K-1.

The method may comprise configuring the sheet substrate to be at least one of metallic and carbon, preferably graphene.

The method may comprise configuring the sheet substrate to comprise an insulating layer.

The method may comprise disposing a sheet insulating layer on the sheet substrate.

The method may comprise overyling the sheet substrate and the temperature sensor with an outer insulating layer.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The summary is provided to introduce a selection of concepts in a simplified form that are further described in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention will now be described further, with reference to the accompanying drawings, in which.

DETAILED DESCRIPTION

Before discussing the embodiments in any more detail, first an overview will be provided. Embodiments provide a temperature sensor suited to providing reliable, accurate and consistent temperature readings of an apparatus, such as a conduit coupled with an abatement apparatus or a vacuum pump. The sensor has a substrate which is reshapeable to intimately fit the shape of the vacuum apparatus and which provides a thermal path to a temperature sensor which measures the temperature of the vacuum apparatus or a portion thereof. The substrate is typically formed of a sheet which may be wrapped around or fitted against the vacuum apparatus or portion thereof and is typically dimensioned to wrap multiple times around the vacuum apparatus or portion thereof. The sheet is also typically dimensioned to be wide enough to reliably contact any local heating or cooling device on the vacuum apparatus in order to reduce temperature variations that may otherwise occur from the placement of the temperature sensor at different locations with respect to that local heating or cooling device.

Temperature Sensor Assembly

Figure 1A:
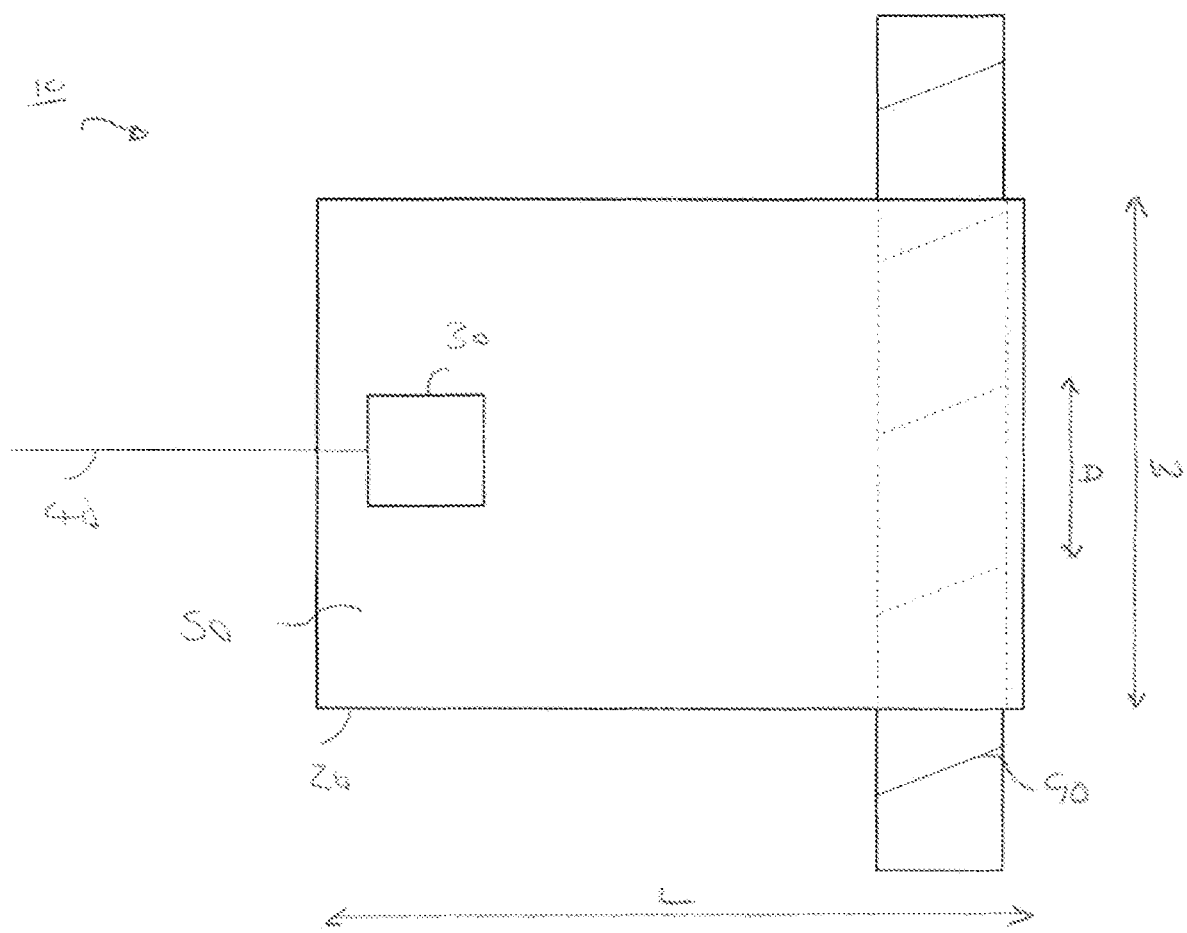
FIGS. 1A and 1B illustrate a temperature sensor assembly according to one embodiment.
Figure 1B:
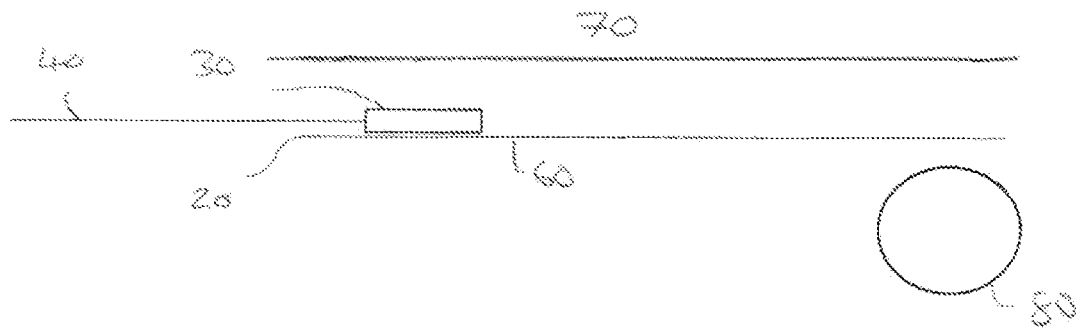

FIGS. 1A and 1B illustrate a temperature sensor assembly 10 according to one embodiment. FIG. 1A is a plan view and FIG. 1B is a side view. The temperature sensor assembly 10 comprises a conductive sheet 20 and a temperature sensor 30 such as a thermistor, thermocouple or the like.

The temperature sensor 30 is connected to a device (not shown) which receives signals indicative of the temperature measured by the temperature sensor 30 by way of one or more wires 40. The temperature sensor 30 is typically bonded using a thermal bond to a first surface 50 of the conductive sheet 20 to enhance thermal coupling between the conductive sheet 20 and the temperature sensor 30. However, the temperature sensor 30 may also be simply placed on the conductive sheet 20 and held in place by wrapping the conductive sheet 20 or by an insulating layer 70.

The conductive sheet 20 has an overall length L and an overall width W, with the length L generally being longer than the width W. In this example, the temperature sensor 30 is positioned midway along the width W but towards one end of the length L of the conductive sheet 20. The conductive sheet 20 is made of a material which is pliable, valuable or conformable to the external surface of the vacuum apparatus 80 to which it is applied. Also, the conductive sheet 20 is made of a material which has a greater thermal conductivity and/or a lower thermal mass than that of the vacuum apparatus 80 to which it is applied. This helps to ensure that the temperature of the conductive sheet 20 changes no slower than that of the vacuum apparatus 80 to which it is applied. Typically, the conductive sheet 20 is made of a metallic (such as aluminium or copper) or a carbon material (such as graphene). Although in this example the conductive sheet 20 is rectangular, it will be appreciated that this need not be the case and that any suitable shape can be provided to suit the vacuum apparatus to which it is being applied such as circular, oval, an irregular shape or even a shape which has voids or openings to allow protrusions from the vacuum apparatus to which it is applied to pass through.

In this example, the temperature sensor assembly 10 is configured to be applied to the vacuum apparatus 80 (in this example, a pipe) which is heated by means of a heater coil 90 which defines a helix along the cylindrical surface of the vacuum apparatus 80. However, it will be appreciated that the temperature sensor assembly 10 can be configured to be applied to other apparatus whose temperature is to be measured. The length L is configured to be greater than the circumference of the vacuum apparatus 80. Typically, the length L is set as many multiples of the circumference in order to provide multiple turns of the conductive sheet 20 around the vacuum apparatus 80. Even though the multiple turns may be in contact, the main thermal path is along the conductive sheet 20, rather than between adjacent turns of the conductive sheet 20. The width W is selected to be no smaller than a distance D between turns of the heater 90. This helps to ensure that no matter where the conductive sheet 20 is placed along the axial length of the vacuum apparatus 80, the conductive sheet 20 will always overlay at least one of the turns of the heater 90. This arrangement helps provide an accurate averaged temperature reading which is less susceptible to local temperature variations experienced by the vacuum apparatus 80. The insulating layer 70 (such as a polymer) is optionally provided and this either is applied after the conductive sheet 20 has been applied to the vacuum apparatus 80 or may be already bonded to the conductive sheet 20 prior to it being applied to the vacuum apparatus 80.

In operation, a conductive sheet 20 with a suitable shape and dimension to be applied to the vacuum apparatus 80 is provided, to which the temperature sensor 30 is thermally coupled and to which the wires 40 are attached. The conductive sheet 20 is wrapped around the vacuum apparatus 80 with a second surface 60 contacting the vacuum apparatus 80; in this example it is wrapped around for a number of turns. The width W of the conductive sheet 20 is wider than the distance D between the turns of the heater 90 and so the conductive sheet 20 will overlie at least one of the turns of the heater 90. The insulating layer 70 is then wrapped around the exposed first surface 50 of the conductive sheet 20.

As the temperature of the heater 90 changes, the high thermal conductivity and low thermal mass of the conductive sheet 20, together with the insulating effect of the insulation layer 70, allows the change in temperature to be rapidly conveyed through the conductive sheet 20 to the temperature sensor 30 and the temperature is then indicated by signals passing over the wires 40.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A vacuum apparatus temperature sensor assembly, comprising:
   a vacuum apparatus whose temperature is to be determined, said vacuum apparatus having heater elements;
   a sheet substrate which is a planar sheet and which is pliable to conform to an external surface of said vacuum apparatus, wherein said sheet substrate has a width which is greater than a distance between said heater elements and wherein said sheet substrate has a length which provides for a plurality of turns around said vacuum apparatus; and
   a temperature sensor thermally coupled with said sheet substrate, wherein the sheet substrate is configured to provide a thermal path from said vacuum apparatus to said temperature sensor and wherein said sheet substrate is interposed between said temperature sensor and said vacuum apparatus.

2. The vacuum apparatus temperature sensor assembly of claim 1, further comprising an outer insulating layer overlying said sheet substrate and said temperature sensor to provide a greater thermal conductivity across said sheet substrate than between said plurality of turns.

3. The vacuum apparatus temperature sensor assembly of claim 1, wherein said sheet substrate has a thermal conductivity selected to reduce a temperature variation across a surface of said sheet substrate compared to a temperature variation across a surface of said vacuum apparatus.

4. The vacuum apparatus temperature sensor assembly of claim 1, wherein said sheet substrate has a thermal mass selected to be lower than a thermal mass of said vacuum apparatus.

5. The vacuum apparatus temperature sensor assembly of claim 1, wherein said temperature sensor overlies said sheet substrate.

6. The vacuum apparatus temperature sensor assembly of claim 1, wherein said sheet substrate has a thermal conductivity selected to be greater than a thermal conductivity of said vacuum apparatus.

7. A method, comprising:
   conforming a sheet substrate, which is a planar sheet and which is pliable, to an external surface of a vacuum apparatus whose temperature is to be determined, said vacuum apparatus having heater elements, and said sheet substrate having a width which is greater than a distance between said heater elements and a length which provides for a plurality of turns around said vacuum apparatus; and
   thermally coupling a temperature sensor with said sheet substrate to provide a thermal path from said vacuum apparatus to said temperature sensor by interposing said sheet substrate between said temperature sensor and said vacuum apparatus.

* * * * *